Feb. 18, 1958  L. E. THOMPSON ET AL  2,824,075
PREPARATION OF GEL CATALYST
Filed Nov. 3, 1952  2 Sheets-Sheet 1

Fig. 1.

Inventors:-
Leslie E. Thompson,
Howard F. Reeves, Jr.,
Salem F. Belt,
BY
Attys.

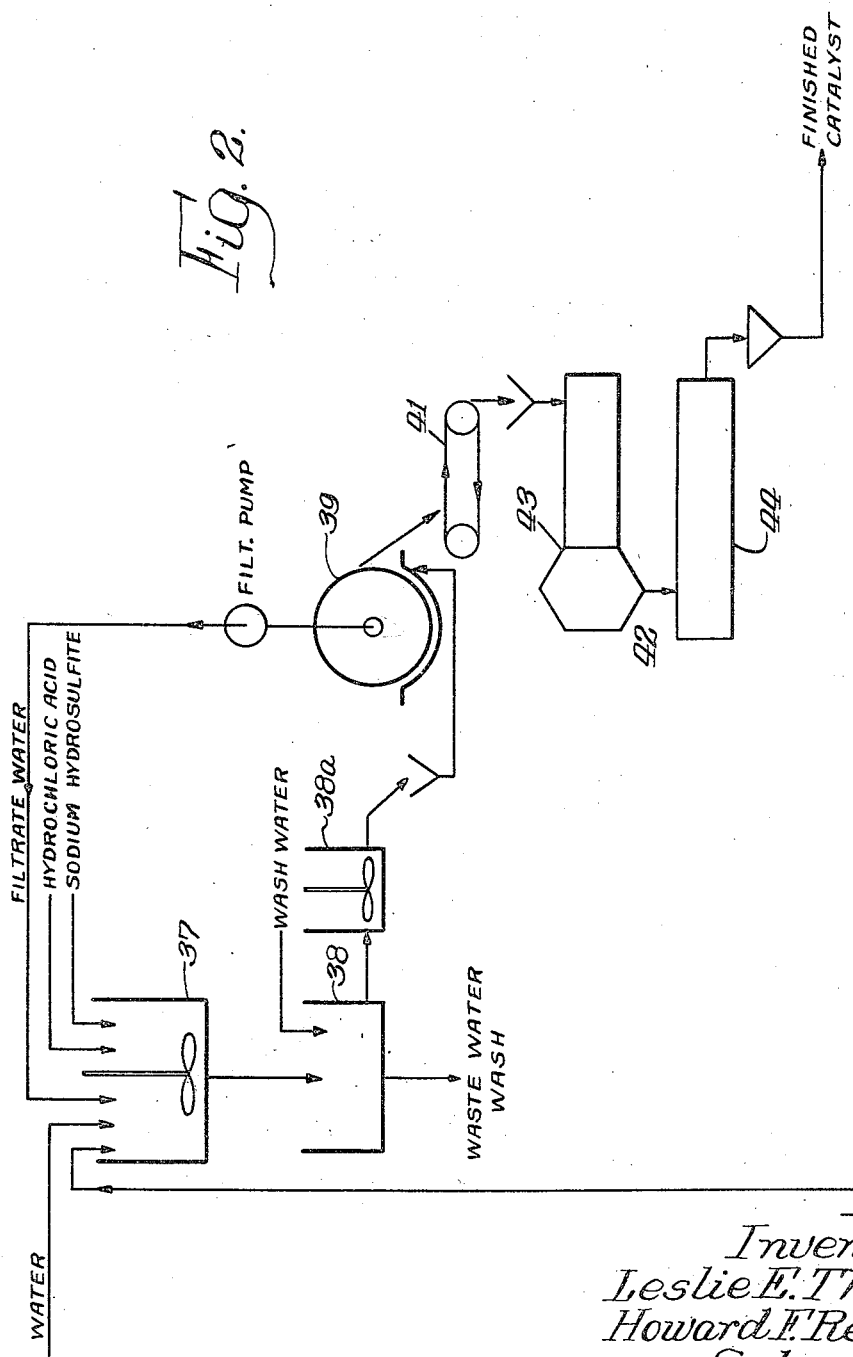

United States Patent Office 2,824,075
Patented Feb. 18, 1958

2,824,075
PREPARATION OF GEL CATALYST

Leslie E. Thompson, Weeks, La., Howard F. Reeves, Jr., Chattanooga, Tenn., and Salem F. Belt, North Texas City, Tex., assignors to Morton Salt Company, Chicago, Ill., a corporation of Illinois Application November 3, 1952, Serial No. 318,414

8 Claims. (Cl. 252—448)

This invention relates to a process for the preparation of catalysts and more particularly to the preparation of microspherical gel catalysts.

Gels in the form of discrete particles have become increasingly important in recent years as catalysts for use in the cracking of petroleum hydro-carbon products. While such catalysts may be prepared by making a hydrosol from silica oxides or from mixtures of silica and alumina oxides, in known manner, converting the hydrosol to a gel, and then grinding the gel, the resulting product is not entirely satisfactory; either the catalytic activity is not as great as might be desirable, or the product undergoes an undesirable amount of attrition when used as a catalyst in fluid cracking processes, or the desired density and uniformity of the product is difficult to attain and control.

The preparation of gel particles by spraying a sol, as in heated air for example, is known. However the prior art processes which involve the spraying of sols to form hydrogel spheres are not applicable when the sol has a high content of a salt such as calcium chloride, and it has been found that attempts to prepare hydrogen spheres by spraying processes when the sol is of this type, have resulted in the production of gel particles which either shattered easily or which had a high tendency to agglomerate after they were formed or both.

Another difficulty associated with the production of such mircrospherical gel particles has been in achieving a low particle density which is desirable in certain fluid cracking operations. While the prior art has disclosed several means for reducing density of gel particles, with none of these has it been possible to avoid substantial cracking of the individual gel spheres during or after the density-reducing treatments.

For obvious reasons it is desirable that a hydrosol which is to be used in producing gel particles be adequately stable against gelling to permit reasonable variations in handling it. While relatively stable sols have been prepared from water glass, the preparation of high silica content sols from acid-soluble, water-insoluble solid silicate compositions having sufficient stability against gelling to permit separation of acid insolubles has not been considered commercially feasible because of the unpredictable sensitivity of such sols.

An important object of this invention is to prepare microspherical catalyst particles by a more efficient, simple and economical process than heretofore available.

Another object is to provide a novel catalyst for use in the fluidized cracking of petroleum hydrocarbons.

A further object is to provide a process for producing microspheroidal catalyst for use in the fluidized cracking of petroleum, which process is adaptable to the use of a wide variety of economical raw materials.

A further object is to provide a process for producing catalyst whose chemical composition and physical attributes can be varied widely.

Another object is to provide a means for producing a substantially iron-free microspherical catalyst from raw materials having a substantial iron content.

A further object is to provide a process for producing, from sols high in salt content, microspherical gel particles having a relatively low density.

The process of our invention is illustrated by the following detailed description together with the accompanying drawings wherein:

Figure 1 is a schematic diagram showing a part of a process presently preferred for carrying out the present invention.

Figure 2 is a schematic diagram showing the remaining steps of the process partially shown in Figure 1.

The practice of our invention involves generally the preparation of a hydrosol, the removal of undissolved materials if any, formation of hydrogel spheres from the hydrosol, and treatment of the resulting hydrogel spheres, as set forth in the following description of our preferred process:

Hydrosol preparation

This step involves the reaction of a silicate and a mineral acid to obtain a relatively stable hydrosol having a relatively high $SiO_2$ content.

By way of specific example, 28.9 pounds of ground basic blast furnace slag are mixed with 135.3 pounds of 12° Bé. hydrochloric acid in the reactor 11. A preferred form of reactor we have used consists of water cooled pipes through which the reaction slurry is circulated by means of a pump during the course of the reaction. However, it will be understood that any conventional water-cooled vessel can be used. The time-temperature conditions of the reaction are preferably controlled so that the reaction is substantially completed within about two minutes at temperatures within the range of about 130–220° F. for at least about one minute of this time period. The reaction is then allowed to proceed as the hydrosol reaction mixture is cooled, within a few minutes to below about 120° F. The pH of the resulting hydrosol should be between about 0.2–1.6 and preferably 0.7–1.1.

The rate of reaction between the slag and acid is a function of the temperature, the rate increasing with increasing temperature, as is well understood by those skilled in the art. We prefer to allow the heat of reaction to raise the temperature of the reactants briefly to the range of about 130°–220° F., as noted above, because the time required for preparation of the hydrosol is thereby considerably shortened, thus effecting an appreciable saving of time in the overall process of gel preparation. However, temperatures below those given above, e. g., normal room temperature, or even lower temperature, may be employed if desired, although at such reduced temperatures correspondingly longer reaction times will be required. The rate of conversion of the hydrosol to hydrogel also increases with increasing temperatures, and therefore the reaction temperature is not permitted to exceed about 220° F. in order to prevent the gelation of the hydrosol before it is atomized in the hydrogel forming step later to be described.

The basic blast furnace slag used in preparing hydrosol according to our preferred process, is ground in a grinding mill to a particles size such that about half is retained on a 325 mesh screen and the remainder passes through.

The chemical composition of one typical slag we have used is set forth in the following table:

TABLE A

| | |
|---|---|
| Percent $SiO_2$ | 36.6–37.4 |
| Percent $Al_2O_3$ | 10.0–11.5 |
| Percent $CaO$ | 39.4–40.9 |
| Percent $MgO$ | 10.3–12.2 |
| Percent $Fe$ | 0.25–0.34 |
| Percent $MnO$ | 0.20–0.34 |
| Percent $H_2S$ | 1.0–1.7 |

(Small amounts of Ti, K, Na, Cr, Ni, V, $CO_2$, $H_2O$)

The hydrosol slurry resulting from the reaction of the slag and acid is discharged from reactor 11 through pipe 12 into a surge tank 13 and from there, through pipe 14 to a centrifuge 15 where undissolved solids are removed from the slurry to provide clear hydrosol.

While the preparation of hydrosols having a silica content of, for example, 7% cannot be considered as high silica content hydrosols for sols made from water glass, they are high for hydrosols made from such materials as slag, because of the greater concentration of salts present and because of the heat of reaction which takes place. These high concentrations of silica in hydrosols prepared from slags are made possible by close control of certain reaction conditions including temperature, reaction time, particle size of the slag used, concentration of reactants, and the temperature-time cycle for the reactants as heretofore described.

Composition of a typical hydrosol is set forth in Table B, below:

TABLE B

| | |
|---|---|
| Percent $H_2O$ | 72.35 |
| Silica as percent $SiO_2$ | 5.77 |
| Percent $AlCl_3$ | 4.25 |
| Percent $CaCl_2$ | 12.20 |
| Percent $MgCl_2$ | 3.89 |
| Percent $FeCl_2$, $MnCl_2$, $TiCl_2$, $SO_4$, $H_2S$ | 1.0± |

From the centrifuge 15, the clear hydrosol passes through pipe 16 to another surge tank 17, through pipes 18 and 19, and to the top of a spray tower 21 by means of a pump 22.

A wetting agent is added to the hydrosol from a tank 23, being introduced into the hydrosol suitably by passage through pipe 24 connecting with pipe 18. A suitable metering device (not shown) controls the introduction of the wetting agent solution.

The use of wetting agents as a component of the hydrosol reduces the stickiness of the surfaces of the hydrogel spheres formed later in the process and thus greatly reduces agglomeration of the spheres. Best results are obtained when a wetting agent which reduces the surface tension of the hydrosol to below about 40 dynes per cm. is used. Examples of suitable wetting agents are isopropyl naphthalene sodium sulfonate (Aerosol C. S.), di amyl sodium sulfonsuccinate (Aerosol A. Y.) sodium alkyl amyl sulfonate (Santomerse No. 3) and the like. Aqueous solutions of such wetting agents are generally used, the quantity required varying from about 0.005% upwardly, preferably from about 0.02 to 0.04%.

The silica content of the resulting hydrosol may be from about 4% up to about 7%.

The apparent viscosity of the hydrosol at the point where it is to be sprayed into the tower 21 may vary from about 3.5 centipoises upwardly, and should preferably be between about 7 to 18 centipoises (80° F.).

Hydrogel sphere formation

This stage of the process involves dispersing the hydrosol in the form of fine droplets in an atmosphere of air and ammonia gas so that the particles gel, aging the resulting hydrogel spheres, and then treating the hydrogel spheres with aqua ammonia.

Referring to Figure 1, the hydrosol is sprayed continuously downward through conventional pressure type atomizing nozzles 25 into the tower 21. Ammonia gas is introduced continuously into the tower at a sufficient rate to produce a pH of about 4.0±.1 in the hydrogel. The height of the tower 21 is sufficient so that the sol droplets gel to hydrogel spheres while suspended in the tower. Air is pumped into tower 21, as shown, by means of a fan 20.

The preferred pH range of the hydrogel spheres at this point is about 4.0±.1 although a range of between about 3.2 to 4.8 is usable. Below this lower limit it has been found that the product will hit the belt (where a 24' tower is used) in a state of insufficient gelation and will agglomerate badly. Above the upper pH limit cracking of the product is substantial and the final product will contain large quantities of fragmented spheres.

Hydrogel treating and slurrying

A slow moving belt conveyor 26 at the base of the tower 21 collects the hydrogel spheres and allows them to age before dumping them into an agitated tank 27 where the product is slurried with about an equal weight of water containing sufficient dissolved ammonia to raise the pH to a point where most of the alumina is retained within the microspheroidal structure.

The aforesaid aging time is an important factor of the operation and is a feature of our process. Although the ammonia in the tower 21 sets the hydrosol into discrete solid particles, the gel is soft and difficult to handle. Collection of the falling hydrogel particles in water, salt solutions and other liquids are not as satisfactory as collecting and aging the product on the belt 26 before slurrying.

For example, catching the hydrogel spheres in water results in spheres which are soft, gummy, and more easily broken in later processing. Furthermore they do not dewater as rapidly or thoroughly without agglomeration in preparing for the subsequent drying.

Catching the falling hydrogel spheres in salt solutions such as calcium chloride, magnesium chloride, sodium chloride and the like instead of on a belt, as in our preferred manner may be done, although the results are not as satisfactory since the resulting spheres are somewhat soft, easily broken and difficult to dewater.

The use of non-wetting liquids instead of the belt is likewise not very satisfactory since the microspheres have a tendency to agglomerate. Alcohols are somewhat more satisfactory than non-wetting liquids insofar as the agglomeration problem is concerned, but the density of the product is undesirably decreased.

In accordance with our preferred process the aging period of the spheres collected on the slow moving belt 26 is about 20–22 minutes. Aging for longer periods before slurrying, unless excessive, appears to have no detrimental effect. However, aging for several hours, for example, is undesirable since considerable syneresis occurs and when the product is subsequently slurried with ammonia, alumina floc precipitates outside the sphere. The exuded liquid causes more agglomeration of the particles, and the said floc decreases the efficiency of subsequent dewatering and washing operations.

The slurrying step is important in the regulation of particle density, quantity of alumina retained in the hydrogel spheres, and particle shape. In this connection, the pH of the slurry in tank 27 should be maintained within about 3.0 to 6.0 and preferably between about 4.3 to 4.8.

Hydrogel dewatering

From the slurry tank 27, the treated hydrogel spheres are carried by suitable conventional elevator means 28 to a continuous vacuum rotary filter 29 which dewaters the hydrogel spheres. The dewatered spheres in the form of filter cake are removed from the filter 29 by conventional means and carried to the drying unit 32 by means of conveyor belt 31. The unit 32 consists of two conventional rotary driers 32a, and 32b wherein the spheres may be heated and dried.

Hydrogel drying

In the driers 32a and 32b, the hydrogel spheres are heated sufficiently to partially dry the spheres, the degree of heating and drying depending on the desired particle density of the finished catalyst. We prefer to heat the hydrogel spheres sufficiently so that the volatile content (determined at 1800° F.) of the hydrogel is about 30–45%, which will result in a final product having a density of about 1.0 or lower.

While two driers are illustrated in the drawing, it is of course understood that a single drier may also be used.

Gel washing

From the drier 32 the dried spheres are carried by conveyor means to a gel treating tank 37 where the spheres are treated as hereinafter described, and the treated gel then washed with water in tank 38 until substantially free of water soluble impurities.

By way of example, a batch of dried gel from drier 32 is placed in a batch of water in tank 37 while agitating the water (27.9 pounds of dried gel to 65.6 pounds of water). The pH of the slurry is then adjusted to about 3.0–3.3 with hydrochloric acid. Sodium hydrosulfite is then added to the slurry and water solution, at the rate of 0.150 pound of sodium hydrosulfite for every 27.9 pounds of dried gel, and then agitated for 45 minutes. If the pH has increased above about 3.3 at the end of the agitation, acid is added to adjust same. The agitation is then stopped, the slurry transferred to wash tank 38 and the gel particles are allowed to settle into cake form. The liquid phase is drained off at the bottom until the liquid level equals the gel cake level. This cake is then washed with water substantially free of cations (preferably less than about 3 p. p. m. of NaCl) and containing sufficient mineral acid to provide a pH of about 2.5.

The purpose of washing the predried microspheres is to remove soluble salts. Salts such as calcium and magnesium chloride offer no difficulty; however the problem in silica gel catalyst manufacture is to retain alumina in the catalyst and remove the iron. The removal of iron from catalyst is important since as little as 0.01% increase in ferric oxide in a silica-alumina catalyst effects a considerable increase in the coke factor.

We have found by the methods of our process that it is possible to retain 90–98% of the alumina present while washing out over 90% of the iron.

The present technique for removing iron is important not only to our preferred process but is likewise applicable to other processes. For example, it is the practice in some catalyst manufacturing processes to use iron-free alum which is considerably more expensive than the iron-containing product. Use of the present iron removal process makes it possible for such processes to be based on the use of a lower cost iron-containing alum.

We have found that iron can be removed from our hydrogels successfully and practically through the use of water soluble hydrosulfites, for example sodium hydrosulfite, stannous chloride, titanium chloride, or hydrogen sulphide. By using the aforesaid materials we were able to reduce the $Fe_2O_3$ to less than .05% in the final product. We have found that from about 0.8 to about 2.0 grams of hydrosulfite per 300 grams of predried material effects very satisfactory iron removal at a pH of 3.0 to 3.2. Greater or less amounts may of course be used. Using hydrogen sulphide gas for example in quantities up to about 0.4 gram per 300 grams of hydrogel, we have likewise been able to reduce the iron content below .05%.

The iron removal technique of the present invention involves reducing ferric iron to ferrous iron, thus solublizing the insoluble iron in the pH ranges in which we prefer to operate, and one of the real features of this technique lies in the fact that though we may have 100% acid soluble iron hydroxide or oxides and aluminum hydroxide together—these being ordinarily considered to be impossible of separation—we are able to obtain an efficient separation thus permitting the use of cheap raw materials containing both iron and aluminum compounds to make a catalyst which meets iron specifications.

Gel dewatering and drying

This step consists of removing the surface water from the washed gel particles, the resulting product having the same composition as the final product except that it contains about 45–50% water.

The gel spheres, after being washed, are transferred to a surge tank 38a and then are dewatered by means of the rotary filter 39 and transferred by means of belt 41 to a dryer unit 42 consisting of rotary driers 43 and 44, where they are dried at a temperature of about 500° F., to produce finished catalyst containing 5 to 6% total volatile.

Representative chemical analysis of the resulting product is as follows:

| | |
|---|---|
| Percent volatile | 5.96 |
| Percent $Al_2O_3$ | 18.29 |
| Percent $Fe_2O_3$ | .03 |
| Percent MgO | .22 |
| Percent CaO | .30 |
| Percent $Na_2O$ | .034 |
| Percent $TiO$ | .37 |
| Percent Mn | .001 |
| Percent $SO_3$ | .37 |
| Percent Cl | .05 |
| Percent $SiO_2$ | 80.18 |

Particle density will run between about 1.00 and 1.1.

The catalyst prepared in accordance with our preferred process hereinbefore described results in a product having about 18% $Al_2O_3$ and 81% $SiO_2$ plus about 1% of minor constituents. If a product having a lower $Al_2O_3$ content is desired this can be accomplished either by (a) dissolving out $Al_2O_3$ by adding acid before the final washing of the product or, (b) by adding sodium silicate and neutralizing acid to the hydrosol or to the reactor mixture before spraying, in sufficient quantity to raise the $SiO_2$ content of the final product to, for example, about 87%. If a product having a higher alumina content is desired, alumina may be mixed with the slag and the mixture reacted with a mineral acid to produce a hydrosol, as described above. Likewise hydrosol may be prepared with added $AlCl_3$ to raise the $Al_2O_3$ content up to 33%.

The present process is considerably more economical to operate than conventional processes even where conventional raw materials instead of slag are to be used, and is adaptable to make use of such materials as sodium silicate, aluminum sulphate and sulphuric acid. Ores containing silicates may also be used as the starting raw material in our process. When sulphuric instead of hydrochloric acid is used with slag a heavy precipitate of calcium sulphate is formed which is removed by filtration before the hydrosol is sprayed.

Low alumina catalyst may be produced from special slags such as the slag taken from electric phosphorus furnaces, which type of slag contains less alumina than the blast furnace slag presently used.

It will be understood that the invention may be variously embodied within the scope of the appended claims and the description of specific forms of the invention is for the purpose of complying with Section 4888 of the Revised Statutes and should not be interpreted as limiting the appended claims except as may be required by the prior art.

We claim:

1. The method of producing gel catalyst for use in fluid catalytic cracking of petroleum which comprises reacting basic blast furnace slag with a mineral acid at a temperature not substantially in excess of 220° F. to form a hydrosol having a pH of 0.2–1.6, removing undissolved matter from the hydrosol, dispersing said hydrosol in the form of fine droplets at a high point in a vertically elongated zone, introducing ammonia gas at an intermediate point in said zone to coagulate said droplets, collecting the resulting particles at the bottom of said zone, aging said particles, mixing said particles with water containing sufficient ammonia to form a slurry having a pH between about 3 and about 6, separating said particles from said slurry, predrying the resulting particles, treating the resulting dried product with a reducing agent, washing the thus treated particles to remove soluble salts therefrom, and then drying the resulting product.

2. The method of claim 1 wherein the said mineral acid is hydrochloric acid.

3. The method of claim 1 wherein the said mineral acid is sulfuric acid.

4. A method of producing a microspheroidal gel catalyst for use in the fluid catalytic cracking of petroleum hydrocarbons which comprises reacting a mixture of basic blast furnace slag and alumina with a mineral acid at a temperature not substantially in excess of 220° F. to form a hydrosol having a pH of 0.2–1.6, removing undissolved matter from the hydrosol, dispersing said hydrosol in the form of fine droplets at a high point in a vertically elongated zone, introducing ammonia gas into said zone to coagulate said droplets, collecting the resulting particles at the bottom of said zone, aging said particles, mixing said particles with water containing sufficient ammonia to form a slurry having a pH between about 3 and about 6, separating said particles from said slurry, drying said separated particles, treating the resulting particles with a reducing agent, washing the thus treated particles to remove soluble salts therefrom and then drying the resulting product.

5. A method of producing a microspherical gel catalyst for use in the fluid catalytic cracking of petroleum which comprises reacting a mixture of a basic blast furnace slag and sodium silicate with a mineral acid at a temperature not substantially in excess of 220° F. to form a hydrosol having a pH of 0.2–1.6, removing undissolved matter from the hydrosol, dispersing said hydrosol in the form of fine droplets at a high point in a vertically elongated zone, introducing ammonia gas into said zone to coagulate said droplets, collecting the resulting particles at the bottom of said zone, aging said particles, mixing said particles with water containing sufficient ammonia to form a slurry having a pH between about 3 and about 6, separating said particles from said slurry, drying said separated particles, treating the resulting particles with a reducing agent, washing the thus treated particles to remove soluble salts therefrom, and drying the resulting product.

6. A method of making a gel catalyst comprising forming a hydrosol by reacting a finely divided basic blast furnace slag with about 12°Bé. hydrochloric acid at a temperature between about 130° and about 220° F. for between about 1 and 2 minutes and cooling the reaction mixture to below about 120° F., separating undissolved solids from said hydrosol, dispersing said hydrosol in the form of fine droplets at a high point in a vertically elongated zone, introducing ammonia gas within said zone to coagulate said droplets, collecting the resulting particles at the bottom of said zone, mixing said particles with water containing sufficient ammonia to form a slurry having a pH between about 3 and about 6, separating said particles from said slurry, drying said separated particles, treating the resulting particles with a reducing agent, washing the thus treated particles to remove soluble salts therefrom, and thereafter drying the product to produce the desired gel catalyst.

7. A method of making a gel catalyst comprising forming a hydrosol by reacting a finely divided basic blast furnace slag with about 12° Bé. hydrochloric acid at a temperature between about 130° F. and about 220° F. for between about 1 and 2 minutes and cooling the reaction mixture to below about 120° F., separating undissolved solids from said hydrosol, dispersing said hydrosol in the form of fine droplets at a high point in a vertically elongated zone, introducing ammonia gas within said zone to coagulate said droplets, collecting the resulting particles at the bottom of said zone, mixing said particles with water containing sufficient ammonia to form a slurry having a pH between about 3 and about 6, separating said particles from said slurry, drying said particles, treating said dried particles with a dilute sodium hydrosulfite solution at about pH 3.0–3.3, washing the thus treated particles to remove soluble salts therefrom, and thereafter drying such washed particles to produce the desired gel catalyst.

8. In the process of preparing a catalyst from a hydrosol formed by reacting basic blast furnace slag with a mineral acid, the improvement which comprises the steps of dispersing said hydrosol in the form of fine droplets at a high point in a vertically elongated zone, introducing ammonia gas into said zone to coagulate said droplets, collecting the resulting particles at the bottom of said zone, aging said particles, mixing said particles with water containing sufficient ammonia to form a slurry having a pH between about 3 and about 6, separating said particles from said slurry, predrying said separated particles, treating the resulting dried product with a reducing agent, washing the thus treated particles to remove soluble salts therefrom, and then drying the resulting product.

References Cited in the file of this patent

UNITED STATES PATENTS

| | | |
|---|---|---|
| 2,085,129 | Stoewener | June 29, 1937 |
| 2,258,099 | Patrick | Oct. 7, 1941 |
| 2,450,394 | Brown et al. | Sept. 28, 1948 |
| 2,453,084 | Brown | Nov. 2, 1948 |
| 2,471,000 | Messenger | May 24, 1949 |
| 2,484,258 | Webb et al. | Oct. 11, 1949 |